United States Patent
Yang et al.

(10) Patent No.: US 10,212,710 B2
(45) Date of Patent: Feb. 19, 2019

(54) SYSTEM AND METHOD FOR COORDINATING SPATIAL REUSE AMONG LOW POWER COMMUNICATIONS DEVICES

(71) Applicant: Futurewei Technologies, Inc., Plano, TX (US)

(72) Inventors: Yunsong Yang, San Diego, CA (US); Gaokun Pang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 109 days.

(21) Appl. No.: 15/169,222

(22) Filed: May 31, 2016

(65) Prior Publication Data

US 2017/0347359 A1 Nov. 30, 2017

(51) Int. Cl.
*H04W 72/04* (2009.01)
*H04W 52/24* (2009.01)

(52) U.S. Cl.
CPC ....... *H04W 72/0473* (2013.01); *H04W 52/24* (2013.01); *H04W 72/0446* (2013.01); *H04W 52/242* (2013.01); *H04W 52/245* (2013.01)

(58) Field of Classification Search
None
See application file for complete search history.

(56) References Cited

U.S. PATENT DOCUMENTS

| | | | | |
|---|---|---|---|---|
| 2013/0107801 | A1* | 5/2013 | Zheng | H04W 52/281 370/328 |
| 2015/0200811 | A1* | 7/2015 | Kasslin | H04L 41/12 370/254 |
| 2017/0171884 | A1* | 6/2017 | Niu | H04W 74/006 |
| 2018/0020441 | A1* | 1/2018 | Lo | H04W 72/0406 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Computer Society, IEEE Std 802.11TM-2012, Mar. 29, 2012, 2,793 pages.
"Neighboring Awareness Networking Technical Specification Version 1.0", Wi-Fi Alliance, May 1, 2015, 98 pages.

* cited by examiner

*Primary Examiner* — Saumit Shah
(74) *Attorney, Agent, or Firm* — Slater Matsil, LLP

(57) ABSTRACT

A method includes determining a transmission power level configuration of time slots of a shared channel using communications occurring within a first communications group and at a first transmission power level, and communicating with a second device in a time slot in accordance with the transmission power level configuration, wherein communications occurring during the time slot is at a second transmission power level, wherein the second transmission power level is lower than the first transmission power level.

20 Claims, 12 Drawing Sheets

| | OPERATING CLASS AND CHANNEL NUMBER | AVAILABILITY INTERVAL DURATION | AVAILABILITY INTERVALS BITMAP | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| LPFA MAP 1 | BAND 2.4GHZ CHANNEL 6 | 16 TUS | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 0 |
| LPFA MAP 2 | BAND Y CHANNEL X | 32 TUS | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | | | | | | | | | | |

*Fig. 7*

(A) SPATIAL REUSE DURING VERY HIGH POWER SLOTS (B) SPATIAL REUSE DURING HIGH POWER SLOTS (C) SPATIAL REUSE DURING LOW POWER SLOTS

SYSTEM AND METHOD FOR COORDINATING SPATIAL REUSE AMONG LOW POWER COMMUNICATIONS DEVICES

TECHNICAL FIELD

The present invention relates to digital communications, and, in particular embodiments, to a system and method for coordinating spatial reuse among low power communications devices.

BACKGROUND

Wearable devices (WDs) are a key market for Internet of Things (IoT). Examples WDs include smart watches, activity trackers, personal health monitors, sports cameras, augmented reality (AR) gadgets, and so on. In order to realize their full potential as IoT devices, the WDs need to be connected to the Internet, at least on an intermittent basis.

Due to their small form factor and the fact that they move when a user wearing them moves, WDs usually run on battery power. In order to prolong the life of the battery, WDs usually do not directly connect to a public land mobile network (PLMN) that uses a cellular technology, because that typically consumes a lot of power. Instead, WDs usually connect to the Internet via a hub device such as a smartphone, for example, when the user is on the move, or a short-range radio device plugged in the power line or an access point (AP) co-located with a home gateway, for example, when the user is at home, wherein the hub device is connected to the Internet using cellular, short-range radio, and/or wire-line technology. The hub device usually operates on utility power or has a larger battery than the ones in WDs. WDs are connected to the hub device using a short range radio technology, such as IEEE 802.11/Wi-Fi, Bluetooth Low Energy (BLE), IEEE 802.15.4/ZigBee, and so forth. Because IEEE 802.11 communications systems (also commonly referred to as Wi-Fi communications systems) are ubiquitous in residences, enterprises, public places, and consumer electronics, Wi-Fi may also become dominant in the WD market if the power consumption of Wi-Fi can be reduced to be on par with BLE or ZigBee.

SUMMARY

In accordance with an example embodiment, a method for inter-device communications is provided. The method includes determining, by a first device, a transmission power level configuration of time slots of a shared channel using communications occurring within a first communications group and at a first transmission power level, and communicating, by the first device, with a second device in a time slot in accordance with the transmission power level configuration, wherein communications occurring during the time slot is at a second transmission power level, wherein the second transmission power level is lower than the first transmission power level.

In accordance with an example embodiment, a method for inter-device communications is provided. The method includes receiving, by a first device, a message including a first indication of a transmission power level configuration of time slots of a shared channel from a second device associated with the first device or a third device of a first communications group, and communicating, by the first device, with the second device in a time slot in accordance with the transmission power level configuration, wherein communications occurring during the time slot is at a first transmission power level, wherein the first transmission power level is lower than a second transmission power level, at which communications within the first communications group occur.

In accordance with an example embodiment, a first device adapted to perform inter-device communications is provided. The first device includes a processor, and a computer readable storage medium storing programming for execution by the processor. The programming including instructions to configure the first device to determine a transmission power level configuration of time slots of a shared channel using communications occurring within a first communications group and at a first transmission power level, and communicate with a second device in a time slot in accordance with the transmission power level configuration, wherein communications occurring during the time slot is at a second transmission power level, wherein the second transmission power level is lower than the first transmission power level.

In accordance with an example embodiment, a first device adapted to perform inter-device communications is provided. The first device includes a processor, and a computer readable storage medium storing programming for execution by the processor. The programming including instructions to configure the first device to receive a message including a first indication of a transmission power level configuration of time slots of a shared channel from a second device associated with the first device or a third device of a first communications group, and communicate with the second device in a time slot in accordance with the transmission power level configuration, wherein communications occurring during the time slot is at a first transmission power level, wherein the first transmission power level is lower than a second transmission power level, at which communications within the first communications group occur.

In accordance with an example embodiment, a communications system with multiple communications groups and multiple transmission power ranges is provided. The communications system includes a first device and a second device, the first and second devices configured to form and/or join a first communication group with one another using transmissions occurring at a first transmission power level, achieve time synchronization within the first communication group using transmissions occurring at the first transmission power level, and designate, obtain, and/or maintain a common time schedule for transmissions occurring at a second transmission power level using transmissions occurring at the first transmission power level, wherein the second transmission power level is lower than the first transmission power level. The communications system includes a third device and a fourth device, the third and fourth devices configured to obtain the common time schedule for transmissions occurring at the second transmission power level, form a second and a third communications groups with the first and the second devices, respectively, using transmissions occurring at the second transmission power level, and communicate with the first and the second devices, respectively, using transmissions occurring at the second transmission power level during a time slot within the common time schedule. Transmissions between the first and third devices and between the second and fourth devices occur during the same time slots and at the same frequency channels.

BRIEF DESCRIPTION OF THE DRAWINGS

For a more complete understanding of the disclosure, and the advantages thereof, reference is now made to the following descriptions taken in conjunction with the accompanying drawing, in which:

FIG. 7 illustrates an example schedule of low power time slots that includes two Low Power Further Availability (LPFA) Intervals Bitmaps according to embodiments presented herein.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
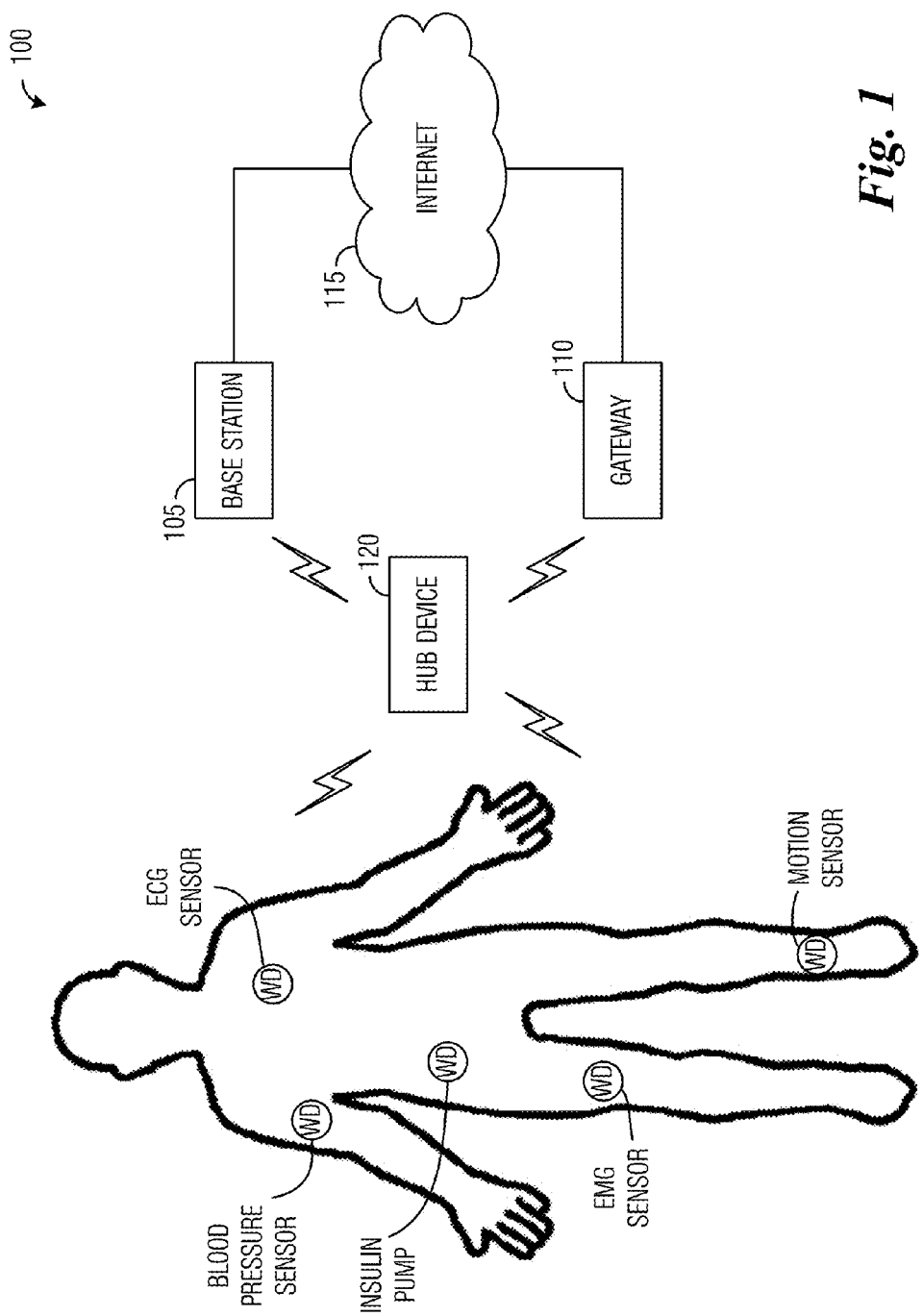
FIG. 1 illustrates an example communications system.

FIG. 1 illustrates an example communications system 100. Communications system 100 includes a base station 105 and/or a gateway 110 connected to the Internet 115. The connection between the Internet 115 and base station 105 or gateway 110 is typically based on wire-line networks over twisted pair, coaxial cable, and/or optical fiber, etc. Communications system 100 also includes a hub device 120 that is also connected to the Internet 115 through either or both base station 105 and gateway 110.

The connection between hub device 120 and base station 105 is typically based on a PLMN using a cellular radio technology such as 3GPP HSPA or LTE, GSM, and so on, and is typically used when hub device 120 is disconnected from a local area network (LAN), such as one installed at the user's home or office. In such a case, hub device 120 may usually be a smartphone or a radio device installed in a car, bus, train, light rail, airplane, and so on. The connection between hub device 120 and gateway 110 is normally based on a local area network either using a short range radio technology (such as IEEE 802.11, Bluetooth, or IEEE 802.15.4) or using a wire-line technology (for example, over twisted pair, cable, or power line), and is generally used when hub device 120 is connected with a LAN, such as one installed at the user's home or office. In such a situation, hub device 120 may typically be a smartphone or a device either co-located or connected (e.g., using power line, twisted pair, cable, or a short-range radio such as IEEE 802.11, Bluetooth, and IEEE 802.15.4) with gateway 110.

Communications system 100 also includes wearable devices (WDs), such as personal health devices (such as ECG sensor, blood pressure sensor, insulin pump, EMG sensor, and so on), activity monitor devices (such as motion sensors, heart rate sensors, body temperature sensors, and so on), information gadgets (such as smart watches, portable video players, portable music players, and so on), etc. Hub device 120 provides connectivity for WDs, typically by using a short range radio technology such as IEEE 802.11, Bluetooth, and IEEE 802.15.4. Alternatively, hub device 120 may be dedicated devices deployed at high density locations to enable WDs to connect to the Internet 115. In such a situation, hub device 120 may be deployed by a home owner, an entity responsible for providing connectivity at the high density location, an operator of a communications system, a provider providing connectivity for pay, a communications system subscriber interested in providing connectivity for credits or discounts, or so on.

While it is understood that communications systems may employ multiple hub devices capable of communicating with a number of WDs, only one hub device, one base station, one access point, and five WDs are illustrated for simplicity.

Base stations may also be commonly referred to as NodeBs, evolved NodeBs, base terminal stations, controllers, communications controllers, and the like. Gateways may also be commonly referred to as home gateways, routers, home routers, access points (AP), home APs, and the like. Although the discussion presented herein focuses on WDs, the example embodiments presented herein are also applicable to other devices, such as sensors, actuators, servo motors, and pumps used in homes, smart grids, industries, and agriculture, and so forth, that may be battery powered with short range radio technology or with both short range radio technology and cellular radio technology but prefers to use the short range radio technology wherever possible to reduce power consumption. Therefore, the discussion of WDs should not be construed as being limiting to either the scope or the spirit of the example embodiments.

Figure 2A:
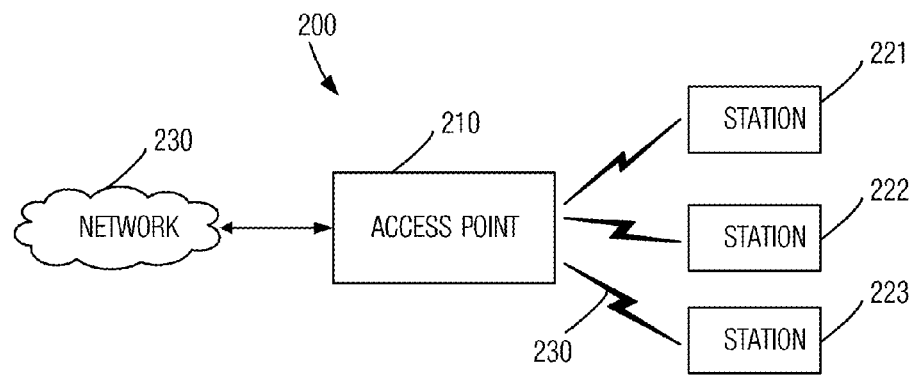
FIG. 2A illustrates a first example communications system operating in an infrastructure-based communications mode.

FIG. 2A illustrates a first example communications system 200 that a hub device and its associated WDs may form by operating in an infrastructure-based communications mode, which is also commonly referred to as Wireless LAN (WLAN) mode. In communications system 200, a hub device, acting as an access point 210, controls certain aspects (such as radio frequency channel, transmission power limit, authentication, security, etc.) of communications with or among its associated WDs, which act as stations, such as stations 221-223. Generally speaking, in communications system 200, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 210 still may influence the resource allocation by assigning different access priorities to stations and/or traffic types, and when succeeding in channel contention, by explicitly allocating certain time periods for certain stations and/or traffics or for special purposes, such as Quiet Period during which time no transmitter may transmit. Access point 210 also provides stations 221-223 with connections to the Internet via a network 230.

Figure 2B:
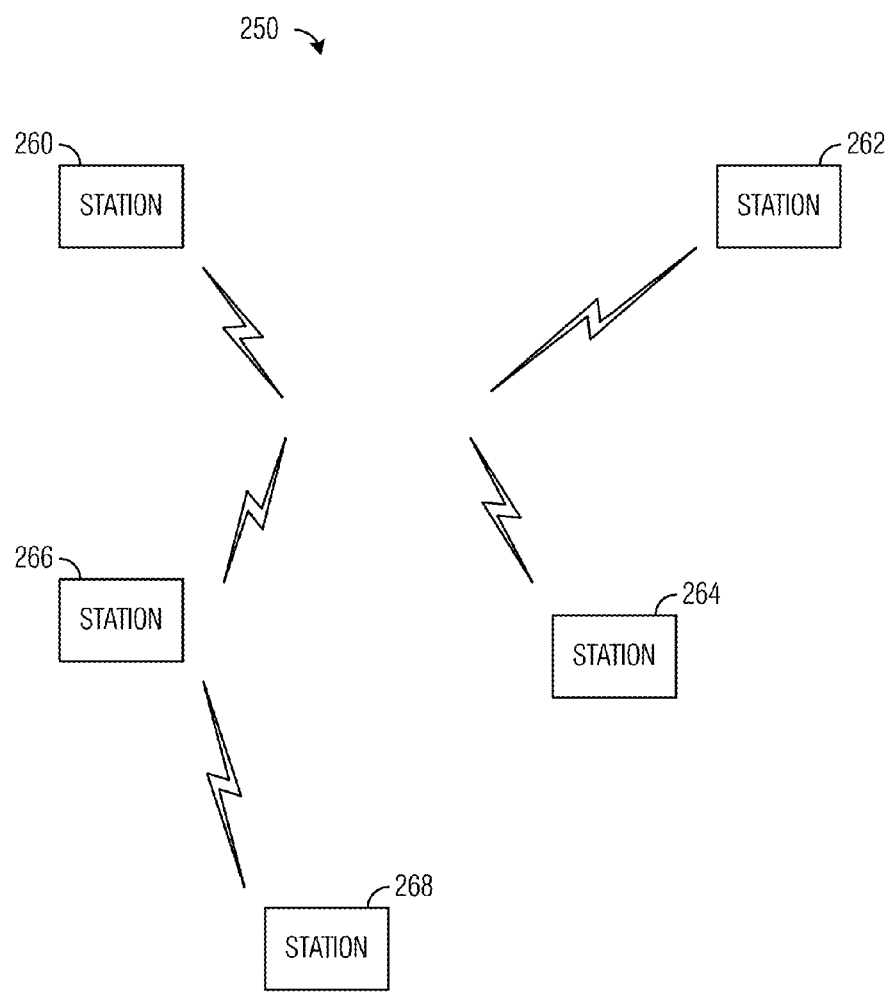
FIG. 2B illustrates a second example communications system operating in an ad-hoc or peer-to-peer communications mode.

FIG. 2B illustrates a second example communications system 250 that a hub device and its associated WDs may form by operating in a direct communications mode, which is also commonly referred to as ad-hoc mode or peer-to-peer mode. In communications system 250, a hub device and its associated WDs may act as peer stations (such as stations 260-268) and may communicate directly with one another based on the CSMA/CA contention mechanism, without going through a centralized entity such as access point 230 of FIG. 2A. Examples of such direct communications include Wi-Fi Direct and neighbor awareness networking (NAN) compliant communications systems, both of which are specified by the Wi-Fi Alliance based on the IEEE 802.11 Standards. A potential difference between Wi-Fi Direct and NAN compliant communications systems is that in Wi-Fi Direct, one of the stations will act as a group owner (GO), which performs a subset of the functionality of an access point. In communications system 250, although the hub device acts as a peer station (such as station 260) to its associated WDs (such as station 262-268), as far as intra-group communications is concerned, the hub device may still have a connection to the Internet, even if the connection is just for the hub device's own needs. Such a connection between the hub device (station 260) and the Internet is intentionally omitted in FIG. 2B.

It is noted that in some deployments, a centralized entity may be used to allocate resources for the communications, but once the resources are allocated, the centralized entity plays no further role in the communications. Additionally, some communications systems are capable of supporting both infrastructure-based and direct communications modes simultaneously. Furthermore, some devices are capable of simultaneously participating in infrastructure-based communications and direct communications modes.

In conventional WLAN, Wi-Fi Direct, or NAN compliant communications systems, there is a lack of sophisticated transmission power coordination schemes among different WLANs or Wi-Fi Direct groups or NAN data groups that are operating in relatively close proximity. As an example, Wi-Fi signals that are transmitted at the conventional power of 100 mWatts can cover up to 100 meters. Therefore, in a high density environment (such as metropolitan areas, shopping malls, schools, airports, train stations, bus terminals, and so forth), if there are many people wearing WDs with their own smartphones serving as the Wi-Fi hubs for their respective WDs, there may be many WLANs (when the smartphones are used as access points serving their associated WDs, for example), Wi-Fi Direct groups (when the smartphones are used as Wi-Fi Direct GOs serving their associated WDs, for instance) and/or NAN data groups (e.g., when the smartphones and their associated WDs form NAN data groups) operating with a transmission power of about 100 mWatts in the same general vicinity. As a result, severe interference and/or data collisions may occur among the different WLANs, Wi-Fi Direct groups, and/or NAN data groups.

Figure 3:
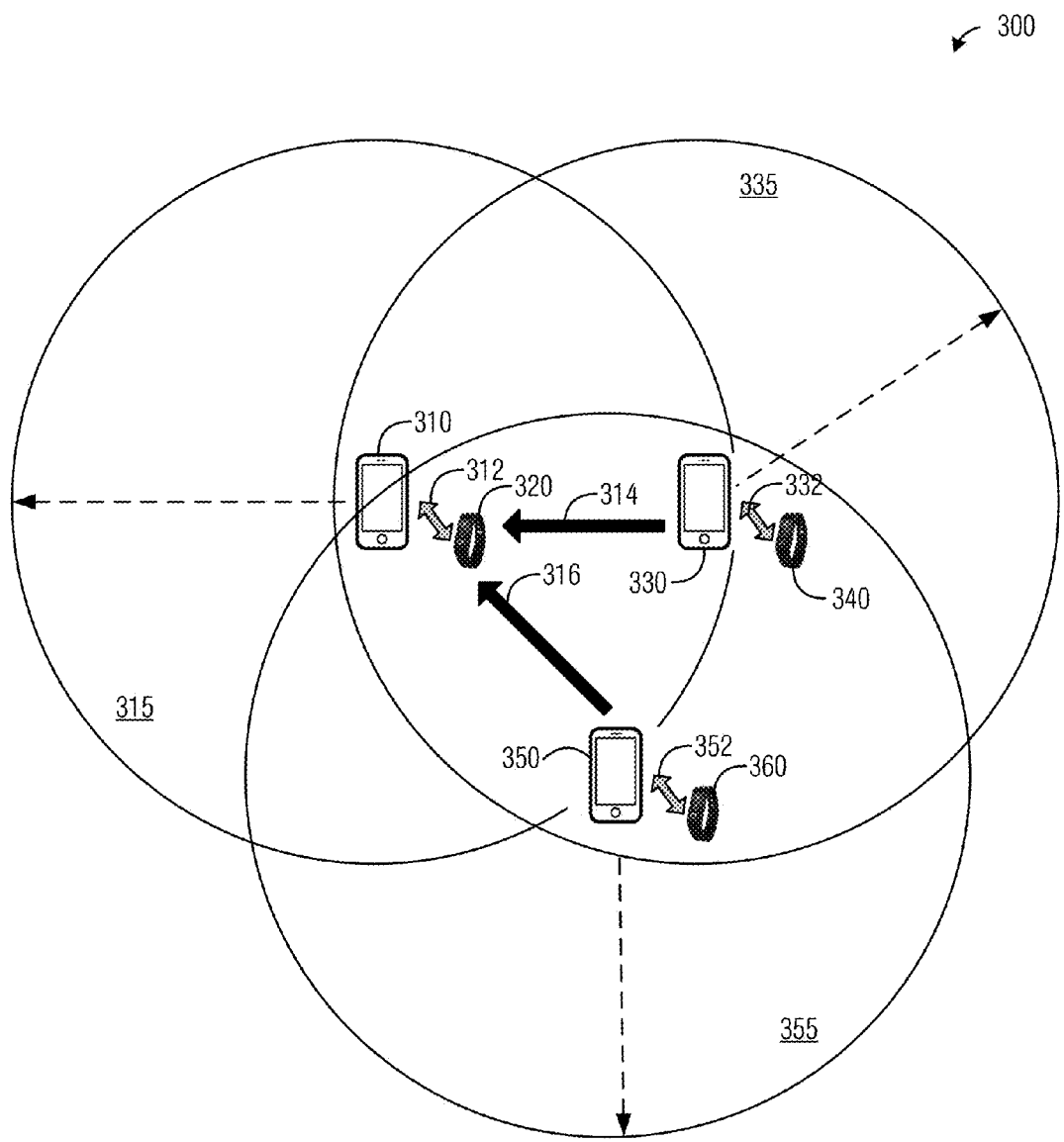
FIG. 3 illustrates an example communications system highlighting a plurality of WLANs, Wi-Fi Direct groups, and/or NAN data groups operating in close proximity.

FIG. 3 illustrates an example communications system 300 highlighting a plurality of WLANs, Wi-Fi Direct groups, and/or NAN data groups operating in close proximity. Communications system 300 includes a first smartphone 310 and a first WD 320 communicating with each other at a conventional high transmission power level (such as 100 mWatts) that is sufficient to cover area 315, a second smartphone 330 and a second WD 340 communicating with each other at a conventional high transmission power level that is sufficient to cover area 335, and a third smartphone 350 and a third WD 360 communicating with each other at a conventional high transmission power level that is sufficient to cover area 355. Each smartphone and its associated WD(s) may form a WLAN, a Wi-Fi Direct group, or a NAN data group in order to communicate with one another. Due to the close proximity of the devices and high transmission power, radio signal 314 of transmission 332 occurring between smartphone 330 and its associated WD 340 and radio signal 316 of transmission 352 occurring between smartphone 350 and its associated WD 360 not only reach their intended destinations, respectively, but also reach the unintended devices in the proximity, such as smartphone 310 and its associated WD 320. As a result, radio signals 314 and 316 may prevent transmission 312 between smartphone 310 and WD 320 from occurring, generate interference to transmission 312, or collide with transmission 312.

According to an example embodiment, a communications system with multiple tiers of communications groups and multiple transmission power ranges is presented, wherein transmissions within a first communication group of a first tier occur at a transmission power level within a first (e.g., high) transmission power range are used to form and/or join a NAN cluster, to achieve time synchronization within the NAN cluster, to designate, obtain, and/or maintain common time schedule(s) for transmissions within at least a second and a third communication groups of a second tier occurring at a transmission power level within a second (e.g., low) transmission power range, wherein the coverage areas of the first tier and the second tier generally overlap each other, wherein a transmission power level within the second transmission power range is much lower than a transmission power level within the first transmission power range, and wherein transmissions within the second and the third communications groups, respectively, can spatially reuse the same frequency and time resources due to the lower transmission power used.

For example, hub devices in the same vicinity form the first communications group (referred to as a pico-group) at the first tier (referred to as a pico-tier) and communicate with one another at a transmission power level within the first transmission power range to facilitate formation and configuration of a NAN cluster, time synchronization among devices within the NAN cluster, designation, acquisition, and maintenance of common time schedule(s) for transmissions occurring at a transmission power level within the second transmission power range, and so on, wherein each hub device and its associated WD(s) form a communications group (referred to as a femto-group) at the second tier (referred to as a femto-tier) and communicate with one another at a transmission power level within the second transmission power range during a designated time. There may be one or more transmission power levels within the second transmission power range that can be used during the designated time. Power ranges are also commonly referred to as power grades. It is noted that there may be multiple designated times for transmissions to occur at a transmission power level within the second transmission power range.

In general, any transmission power level within the second transmission power range is carefully chosen so that the interference caused by transmissions occurring at such transmission power level(s) within a femto-group doesn't harm the transmissions also occurring at similar transmission power level(s) within any other femto-group in the proximity. As a result, the spectrum shared by different femto-groups in the proximity can be spatially reused during the same designated time. In addition, the power consumption of the communicating devices during the designated time is lower when compared to the case where the communicating devices are using a transmission power level within the first transmission power range. As an illustrative example, the hub devices form a NAN cluster to achieve time synchronization between the hub devices and to maintain common schedules of designated low power time slots by using signaling transmissions occurred at transmission power levels within the first transmission power range. Then, during the designated low power time slots only transmissions occurring at transmission power levels within the second transmission power range are permitted. In some configurations, the WDs may be capable of transmitting only at transmission power level(s) within the second transmission power range. In this situation, communications between a hub device and associated WDs may occur only within designated time slots and only at transmission power level(s) within the second transmission power range.

According to an example embodiment, the communications system supports a first high transmission power range and a second low transmission power range. The second low transmission power range is used for communications between a hub device and associated WDs and only occurs during designated low power time slots. The first high transmission power range is used for communications between hub devices, as well as non-hub devices, and the communications do not occur during the designated low power time slots.

Figure 4:
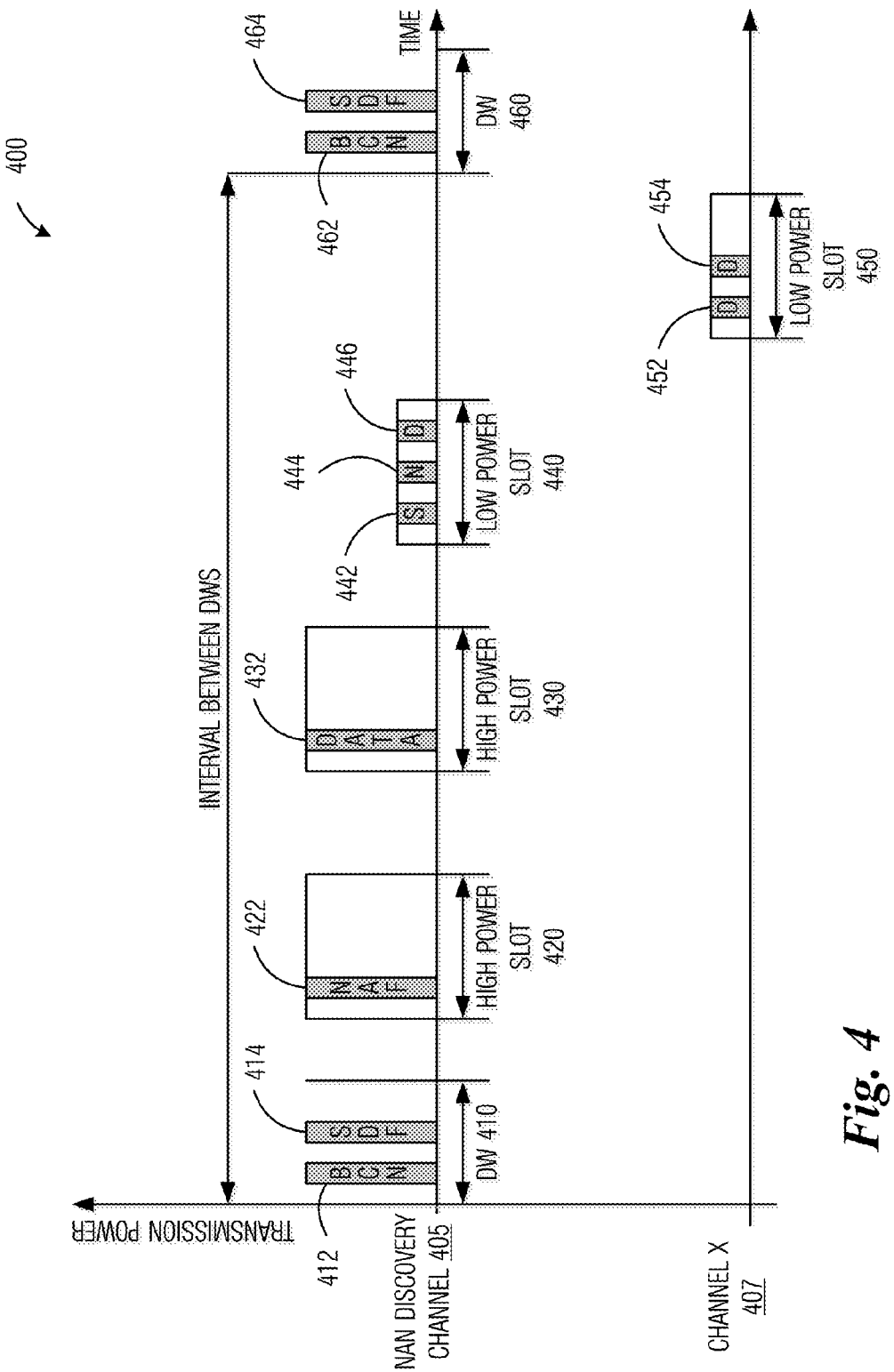
FIG. 4 illustrates a diagram illustrating transmission power level as a function of time slot in an example communications system according to embodiments presented herein.

FIG. 4 illustrates a diagram 400 illustrating transmission power range and level as a function of time slot in an example communications system. Diagram 400 illustrates transmission power occurring at a NAN discovery channel 405, which is the Channel 6 on the 2.4 GHz band, and at a channel X 407. Channel X 407 may be a different channel on the 2.4 GHz band or a channel on a different frequency band such as the 5 GHz band.

As shown in FIG. 4, in a NAN cluster formed by various hub devices, a sequence of discovery windows (DWs) with a regular interval in between are designated on NAN discovery channel 405, including DWs 410 and 460. During each DW, one or more NAN synchronization beacon (BCN) frames such as BCNs 412 and 462 may be transmitted by member devices of the NAN cluster at a transmission power level within the first high transmission power range. The BCN frames are used for propagating information about the NAN cluster and time synchronization, and are based on a distributed beaconing mechanism as specified by Wi-Fi Neighbor Awareness Networking (NAN) Technical Specification v1.0 published by the Wi-Fi Alliance. During each DW, zero or more Service Discovery Frame (SDF) such as SDFs 414 and 464 may also be transmitted at a transmission power level within the first high transmission power range to advertise or search for a service. DW 410 is followed by a plurality of high power slots, including a first high power slot 420 (during which a NAN action frame (NAF) 422 is transmitted, e.g., for the purpose of managing the NAN cluster) and a second high power slot 430 (during which a data 432 is transmitted, e.g., between the hub devices). Like the NAN synchronization beacons, transmissions of both NAF 422 and data 432 also occur at a transmission power level within the first high transmission power range so that the transmitted signals are sufficiently strong to reach the intended destinations that are relatively far away. One can consider a DW as a special case of a high power slot.

The hub devices may use signaling messages, such as NAN synchronization beacons (e.g., BCN 412), SDFs (e.g., SDF 414), and NAFs (e.g., NAF 422), to schedule, propagate, obtain, and maintain a sequence of low power time slots, which are designated for transmissions occurring only at a transmission power level within the second transmission power range. This sequence of low power time slots may be common for (and therefore complied with by) all devices within the NAN cluster or may be at least common for (and therefore complied with by) devices within a region within the NAN cluster. The high transmission power level(s) used to transmit these signaling messages ensures that the commonality can be achieved within a relatively wide area. Although shown following the plurality of high power slots, the sequence of low power time slots may precede the plurality of high power slots or be interspersed within the plurality of high power slots.

As illustrated in FIG. 4, a low power slot 440 is scheduled on NAN discovery channel 405, during which time an SDF (shown as 'S' 442), an NAF (shown as 'N' 444), and a data (shown as 'D' 446) are transmitted between devices within a femto-group of the second tier at a transmission power level within the second low transmission power range. The SDF (such as S 442) may be used for service discovery between devices within the femto-group. The NAF (e.g., N 444) may be used for managing the femto-group, such as setting up the femto-group, authenticating a device, setting up a NAN data link (NDL) between devices within the femto-group, etc. Transmissions between devices within other femto-groups of the second tier in the proximity may also occur during low power slot 440 and are omitted in FIG. 4 to maintain simplicity, because otherwise they would have to be shown as superimposed frames over low power slot 440 or be shown in a 3-dimension drawing with the third dimension being the space. In general, transmissions within a femto-group of the second tier occurring during a low power slot may be based on not only a Wi-Fi based protocol such as NAN, WLAN, independent basic service set (IBSS), or Wi-Fi Direct, but also a non-Wi-Fi radio technology such as Bluetooth, Bluetooth Low Energy (BLE), ZigBee, ANT+, LTE Direct (LTE-D), LTE Device-to-device (LTE D2D), LTE Vehicle to X (LTE-V2X), LTE Unlicensed (LTE-U), License Assisted Access (LAA), etc., as long as the transmission power level is within the second transmission power range. Thus, any combination of frames defined by these protocols, technologies, and the alike are possible for the low power slots.

As discussed previously, the transmission power level of transmissions occurring in a low power slot is much lower than the transmission power level of transmissions occurring in a high power slot. As an illustrative example, the transmission power level of transmissions occurring in a low power slot may be in the range of 100 µWatts to 1 mWatt, while the transmission power of transmissions occurring in a high power slot may be in the range of 10 mWatts to 100 mWatts. However, the transmissions occurring in a low power slot are mainly for communications between the hub devices and their associated WDs, the distances between which are usually much shorter than a typical distance between two neighboring hub devices. Therefore, despite the much lower transmission power level used, those transmissions occurring in the low power slots can generally reach their intended recipients while not generating significant interference to any unintended recipients in the proximity, which are generally much farther away compared to the intended recipient(s). For example, the distance between an activity tracker worn on the wrist of a user and a smartphone placed in the user's pocket may be a fraction of one meter while a typical distance between two adjacent persons and their associated WDs may be several meters. The successful mitigation of interference among femto-groups of neighboring hub devices and their associated WDs enable the spatial reuse of the same frequency channel during the same low power slot(s) for data transmissions between devices within respective femto-groups, thus improving the spectrum efficiency. Additional high power or low power slots may be possible before DW 460 but are omitted in FIG. 4 to maintain simplicity.

As shown in FIG. 4, a low power slot 450 is also scheduled on channel X 407, during which time data 452 and 454 are transmitted between devices within a femto-group of the second tier. Transmissions between devices within other femto-groups in the proximity may also occur during low power slot 450 and are omitted in FIG. 4 for the same reason as stated before. Although channel X 407 is shown as including only a single low power slot, multiple low power slots are supported. Furthermore, channel X 407 may include high power slots.

Figure 5:
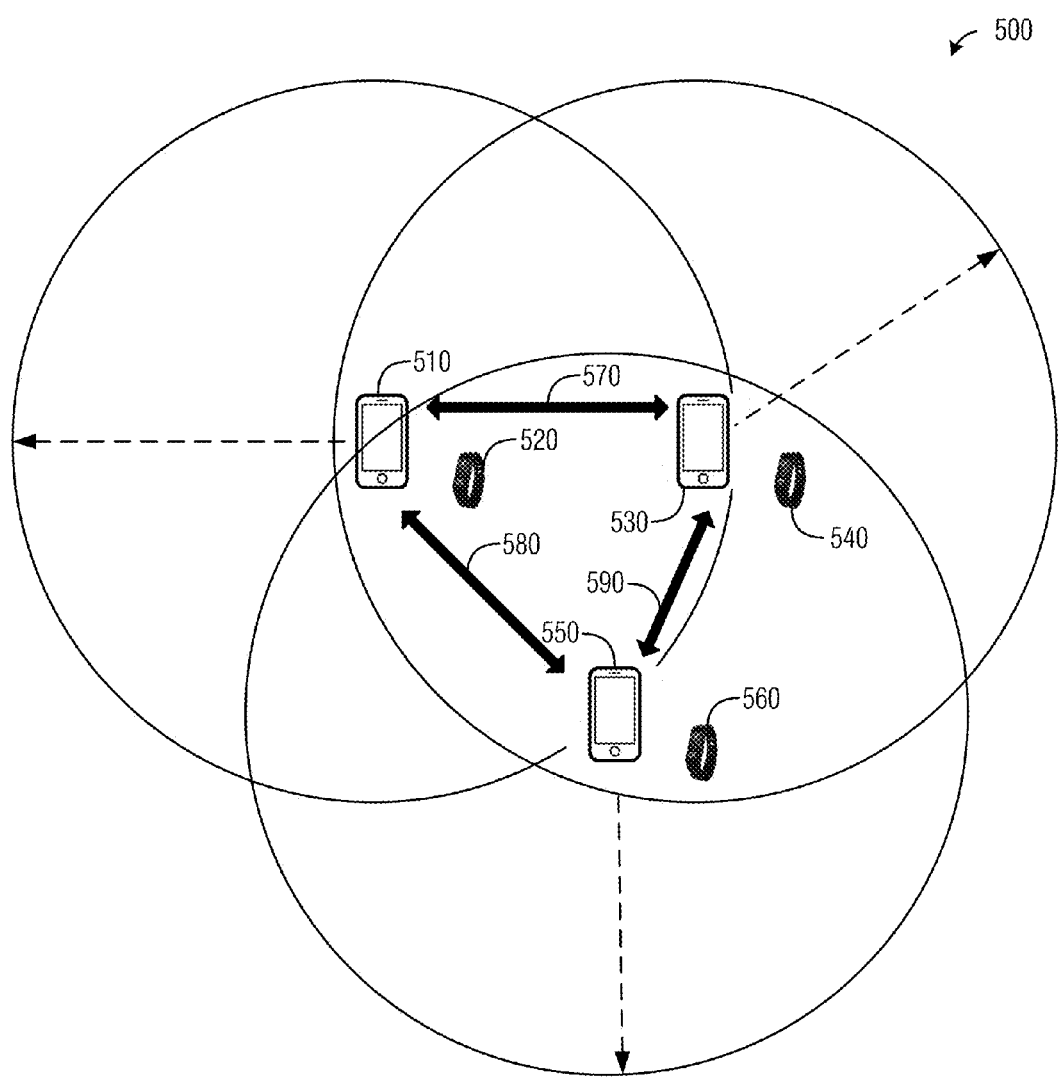
FIG. 5 illustrates an example communications system highlighting communications occurring at high transmission power levels according to embodiments presented herein.

FIG. 5 illustrates an example communications system 500 highlighting communications occurring at transmission power levels within the first high transmission power range. Communications system 500 includes a hub device 510 and associated WD 520, a hub device 530 and associated WD 540, and a hub device 550 and associated WD 560. Hub devices 510, 520, and 530 form a communication group (a pico-group) at the first tier (the pico-tier). A NAN cluster is formed by the devices (such as hub devices 510, 520, and 530) of the pico-group at the first tier. Transmissions, such as transmissions 570, 580, and 590, among hub devices 510, 530, and 550, occur at transmission power level(s) within the first high transmission power range during DWs, as well as allocated high power slots. The transmissions may be used for propagating information of the NAN cluster, maintaining NAN cluster synchronization, negotiating, obtaining, or scheduling common schedules of low power slots, as well as, data or other management frames. A WD (such as WDs 520, 540, and 560) may also join the NAN cluster as a non-Master non-Synch device, as long as the WD is equipped with the Wi-Fi radio interface and is compliant with the NAN protocol. Such a WD may not be capable of transmitting NAN signaling messages or data at a high transmission power level during the DWs or high power slots. However, by joining the NAN cluster, it is still capable of overhearing (i.e., receiving) the NAN signaling messages transmitted during the DWs or high power slots, such as transmissions 570, 580, and 590, and by doing so, obtaining information for time synchronization and the scheduling information of the designated low power time slots, without requiring the exchange of extra signaling messages with its associated hub device. Because there is no communications involving WDs during the DWs and high power slots, the low power transmissions involving WDs are not interfered with or blocked.

Figure 6:
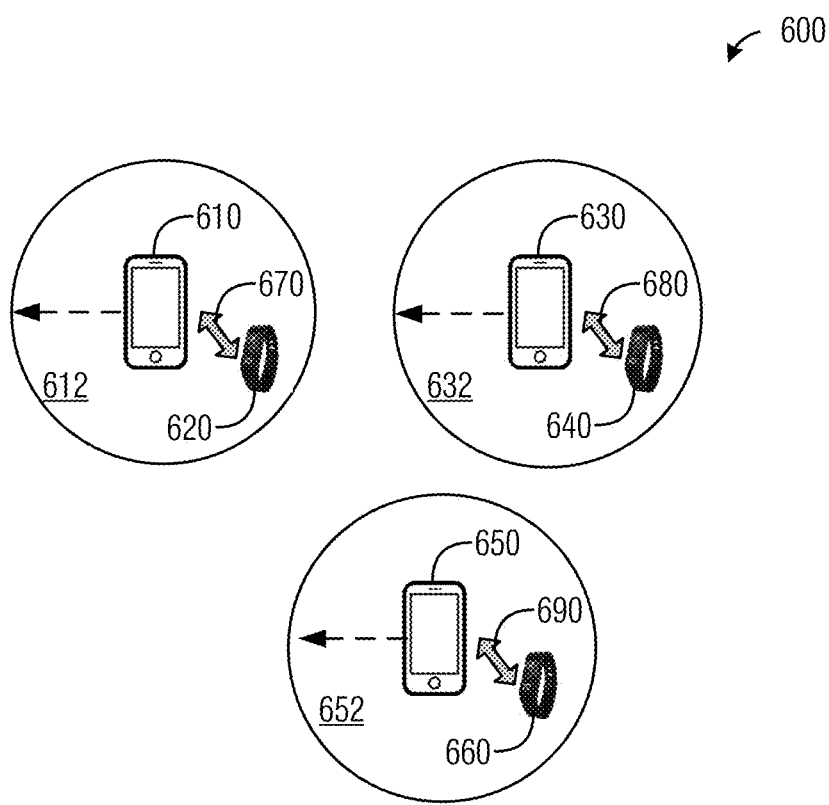
FIG. 6 illustrates an example communications system highlighting communications occurring at low transmission power levels during a designed low power time slot according to embodiments presented herein.

FIG. 6 illustrates an example communications system 600 highlighting communications occurring at transmission power levels within the second low transmission power range in a low power slot. Communications system 600 includes a hub device 610 and associated WD 620, a hub device 630 and associated WD 640, and a hub device 650 and associated WD 660. Hub device 610 and associated WD 620, hub device 630 and associated WD 640, and hub device 650 and associated WD 660 form respective femto-groups at the second tier (the femto-tier). As discussed previously, communications involving a WD during low power slots occur at a low transmission power level. Transmissions, such as transmissions 670, 680, and 690, between hub devices 610, 630, and 650, and WDs 620, 640, and 660, respectively, occur at transmission power level(s) within the second (low) transmission power range during low power slots.

Due to the low transmission power used, the coverage of the low power transmissions shrink significantly (shown as small coverage areas 612, 632, and 652). The small coverage areas of the low power transmissions enable the spatial reuse of the same spectrum even when the communicating devices, which otherwise would be interferers to each other, are in close proximity of one another. The spatial reuse of the same spectrum results in higher spectral efficiency. Additionally, the low transmission power levels result in lower power consumption and longer battery life. Furthermore, the user's privacy (e.g., the user's health status as indicated by a wearable medical device) is better protected because the smaller propagation area of the low power transmissions makes eavesdropping less effective, if carried out too far away, or easier to be discovered, if carried out too close by.

According to an example embodiment, the scheduling of low power time slots is indicated in one or more Low Power Further Availability (LPFA) Intervals Bitmap field(s). An LPFA Intervals Bitmap field comprises an Availability Intervals Bitmap subfield, which basically is a string of bits representing a repeatable pattern of the time slot(s) that are designated for a special purpose such as for low power transmissions, among a sequence of pre-specified time slots. FIG. 7 illustrates an example schedule 700 of low power time slots that includes two LPFA Intervals Bitmaps. The interval between two consecutive DWs (such as DWs 410 and 460 of FIG. 4) is 512 time units (TUs) long and is uniformly divided into 32 time slots numbered from 0 to 31, respectively, where a TU equals to 1024 microseconds. If a time slot is designated as a low power slot, a corresponding bit in the Availability Intervals Bitmap subfield is set to a first value, e.g., a binary 1. If the time slot is not designated as a low power slot (or is designated as a high power slot), the corresponding bit in the Availability Intervals Bitmap subfield is set to a second value, e.g., a binary 0.

Each LPFA Intervals Bitmap field may further include a control information subfield indicating some control information such as the operating band and channel number of the channel that the associated bitmap is applied on, an Availability Interval Duration, an indicator indicating if the associated bitmap is repeated, and if repeated, for how long (such as continuously, for a specified number of inter-DW intervals, etc.), and so on. As shown in FIG. 7, a first LPFA Intervals Bitmap 705 (i.e., LPFA MAP 1) is applied on Channel 6 of the 2.4 GHz band, and each bit in the Availability Intervals Bitmap subfield corresponds to a single time slot that is 16 TUs long (as indicated by the Availability Interval Duration value). Therefore, the LPFA Intervals Bitmap field for LPFA Map 1 may have a control information subfield followed by a 32-bit Availability Intervals Bitmap subfield. Meanwhile, a second LPFA Intervals Bitmap 710 (i.e., LPFA MAP 2) indicates additional low power time slots that are scheduled on Channel x of Band y, as shown in FIG. 7. As Channel x may be less crowded than the NAN discovery channel, two consecutive time slots are allocated for low power transmissions. In this case, indicating these two consecutive time slots using the same 32-bit bitmap may be wasteful as far as signaling overhead is concerned. Therefore, the Availability Interval Duration in the control information subfield indicates a value of 32 TUs, meaning that each bit in the bitmap corresponds to two consecutive 16-TU-long time slots. In this way, the Availability Intervals Bitmap subfield for LPFA Map 2 may have a control information subfield followed by a 16-bit Availability Intervals Bitmap subfield, which has a shorter length. All together, LPFA MAP 1 705 and LPFA MAP 2 710 in FIG. 7 show that time slot #12 and #24 on Channel 6 of the 2.4 GHz band and time slots #16 and #17 on Channel x of Band y are scheduled as the designated low power time slots.

According to an example embodiment, a common schedule of low power time slots is shared and complied with by all NAN devices within a NAN cluster so that all hub devices that are members of the NAN cluster can serve their associated WDs during the same designated low power time slots, using WLAN, Wi-Fi Direct, NAN, Bluetooth, BLE, ZigBee, etc. In this case, the common schedule of low power time slots may be initiated by a NAN device and propagated to NAN devices throughout the NAN cluster by all NAN Master devices and non-Master Synch devices by including one or more LPFA Intervals Bitmap fields indicating such a common schedule in the NAN Synchronization Beacons (such as BCN 412 of FIG. 4) that they transmit, which is similar to the way that the NAN cluster timing information and Anchor Master Rank information are propagated according to NAN Release 1 technical specifications. The schedule of low power time slots (i.e., LPFA Intervals Bitmap(s)) may also be propagated by other management messages, e.g., service discover frames (such as SDF 414 of FIG. 4), NAN action frames (such as NAF 422 of FIG. 4), and so on.

According to an alternative example embodiment, multiple hub devices, which are members of the same NAN cluster and operating in close proximity so that they can all hear one another, may form a NAN data cluster (NDC) and share the same scheduling of low power time slots (thus the same LPFA Intervals Bitmap(s)), but the entire NAN cluster comprises multiple NDCs, each of which may have a different scheduling of low power time slots. In this situation, the LPFA Intervals Bitmap(s) used within the NDC may be negotiated among the hub devices that make up the NDC, for example, by using NAN action frames (such as NAF 422 of FIG. 4). The coordination among the hub devices within the NDC allows for dynamic adjustments of the shared schedule of low power time slots.

According to an example embodiment, a NAN device in a NAN cluster or NDC is able to join another Wi-Fi connection, such as an infrastructure based WLAN that normally uses the conventional high transmission power such as 100 mWatts, through concurrent operation, for example. Even if the NAN device is not serving any WDs, it is still aware of the schedule of the designated low power time slots within the NAN cluster or NDC, since it is capable of receiving and processing the LPFA Intervals Bitmap(s) in the NAN Synchronization Beacons, the SDFs, the NAFs, etc. If the NAN device is also an access point serving the WLAN, the NAN device may enforce the same or similar restrictions on the transmission power levels (i.e., only transmissions occurred at transmission power levels within the second low transmission power range are allowed during the designated low power time slots) upon the stations, which are served in the WLAN but may not be part of the NAN cluster or NDC, for example, by announcing similar low power periods to stations served in the WLAN using WLAN signaling messages. If the NAN device is not the access point serving the WLAN, the NAN device may inform the access point of the WLAN, using WLAN signaling messages, about the schedule of the designated low power time slots (the LPFA Intervals Bitmap(s)) used by the NAN cluster or NDC so that the access point may enforce the same or similar restriction on the transmission power levels upon the stations in the WLAN, for example, by announcing similar low power periods to stations served in the WLAN using WLAN signaling messages.

The enforcement of restrictions on the transmission power levels upon the legacy stations of the WLAN that are already deployed in the field may be achieved if the LPFA Intervals Bitmap is applied to a channel in the 5 GHz band where Quite Periods that coincide with the designated low power time slots may be requested and announced by an access point to stop all stations within the WLAN from transmitting during the indicated Quiet Periods. It is noted that Quiet Periods, as a part of the dynamic frequency selection (DFE) feature to satisfy regulatory requirements for using 5 GHz band in certain regions in the world, were specified in IEEE 802.11h and have been implemented in some legacy stations that are already deployed in the field in the 5 GHz band. The concept of Quiet Periods may be extended to the 2.4 GHz band. The high power WLAN is just an example of a neighboring radio network where the transmission power used is normally high but the low transmission power restriction or Quiet Periods may be enforced if the information of the designated low power time slots is made available to the radio network, e.g., by having a NAN device concurrently operating in the NAN cluster and the radio network. Other examples of such a neighboring radio network may be based on Wi-Fi Direct, IBSS, IEEE 802.11 mesh network, Bluetooth, LTE-U, LAA, etc.

According to an example embodiment, NAN devices are categorized according to their transmission power range capabilities. A category 1 device is capable of transmitting at the first high power range (e.g., 10 mWatts to 100 mWatts) as well as at the second low power range (e.g., 100 µWatts to 1 mWatt), as an example, a smartphone or access point serving as a hub device for WDs. Category 1 NAN devices may take any role or state defined by the NAN technical standards, negotiate or participate in maintaining the LPFA Intervals Bitmap(s), and transmit at only transmission power levels within the low transmission power range during low power time slots and at transmission power levels within the high transmission power range at other times. A category 2 device is capable of transmitting at the transmission power levels within the second low transmission power range (e.g., 100 µWatts to 1 mWatt), a WD, as an example. Category 2 NAN devices may only assume a non-Master role and non-Sync state. Furthermore, category 2 NAN devices can only transmit during low power time slots as indicated by the LPFA Intervals Bitmap(s). A category 3 device is capable of transmitting at the transmission power levels within the high transmission power range (e.g., 10 mWatts to 100 mWatts). Category 3 NAN devices should not transmit during the low power time slots as indicated by the LPFA Intervals Bitmap (s). A category 3 NAN device may be a device not directly serving any WDs. However, it may still be capable of propagating the information of the LPFA Intervals Bitmap(s) within the NAN cluster or onto a non-NAN Wi-Fi network or a non-Wi-Fi radio network in the vicinity, if the category 3 NAN device also joins the other radio network through concurrent operation, as described in the previous paragraph.

According to an example embodiment, the low transmission power range (and the transmission power levels within it) used during the low power time slots may be pre-specified. According to an alternative example embodiment, the low transmission power range (and the transmission power levels within it) used during the low power time slots may be initiated by a NAN device and then propagated throughout the NAN cluster, like the LPFA Intervals Bitmap. According to another alternative example embodiment, the low transmission power range (and the transmission power levels within it) used during the low power time slots may be negotiated among the NAN devices within the same NDC. According to yet another alternative example embodiment, the low transmission power range (and the transmission power levels within it) used during the low power time slots may be dynamically determined, for example by the hub device, based on factors, such as estimated path loss(es) between neighboring hub devices, which communicate with their respectively associated WDs by using WLAN, Wi-Fi Direct, NAN, Bluetooth, BLE, ZigBee, etc.

As an illustrative example, during DWs or high power time slots, a hub device may estimate the path loss between itself and a neighboring hub device, with the estimation being based on transmitted and received power levels (or signal strengths) of a frame (such as a NAN Synchronization Beacon frame or SDF) received from the neighboring hub device. The transmitted power level may be pre-specified or indicated by the neighboring hub device. The received power level or signal strength may be measured by the hub device. The hub device may determine a permissible transmission power level or transmission power range that will not cause interference to neighboring femto-groups, etc. In addition to the estimated path loss, the determination of the permissible transmission power level or transmission power range may also be in accordance with an interference tolerance threshold such as the receiver sensitivity of the neighboring hub device and/or those of their associated WDs, one or more detection thresholds used by the neighboring hub device, e.g., for clear channel assessment (CCA), and/or those used by their associated WDs. In order to support determination of the permissible transmission power level or transmission power range, neighboring hub devices may exchange information related to their interference tolerance threshold, receiver sensitivity and CCA detection threshold(s), as well as those of their associated WDs, for example, by using NAN action frames such as NAF 422 of FIG. 4. Once determined, the hub device may inform its associated WDs about the permissible transmission power level or transmission power range that they can use for transmissions within the femto-group, for example, by using NAN action frames such as N 444 of FIG. 4.

According to an example embodiment, a WD may be capable of transmitting at both low and high transmission power ranges. If a common schedule of low power time slots can be obtained by its associated hub device, the hub device instructs the dual-power-capable WD to use low transmission power for transmissions within the femto-group that they form. In this case, the dual-power-capable WD may still use high transmission power for transmissions to devices outside the femto-group. However, if the hub device is not able to obtain a common schedule of low power time slots, for example, when there is no NAN cluster established in the area or there are other high power Wi-Fi networks or non-Wi-Fi radio networks that can not comply with the low power restriction, the hub device instructs the dual-power-capable WD to use high transmission power for transmissions within the femto-group. Such an instruction can be provided when the hub device sets up a data link with the dual-power-capable WD. For example, in a NAN data group, when a NAN data link (NDL) is set up between two peer NAN devices, a NAN action frame (NAF) carrying an NDL Setup Request or NDL Setup Response message may include an indication indicating if only low transmission power range or power levels can be used for transmissions over the NDL. If only low transmission power range or power levels can be used for transmissions over the NDL, the message may further include the information of the permissible low transmission power range or transmission power levels.

According to an example embodiment, a communications system uses any radio access technology. Although the discussion presented herein focuses on examples using Wi-Fi protocols such as WLAN, Wi-Fi Direct, and NAN, other radio access technologies, such as Bluetooth, BLE, IEEE 802.15.4/ZigBee, 3GPP LTE (including 3GPP LTE-U, LAA, LTE D2D and 3GPP LTE V2X), may be used not only for the transmissions among the hub devices and their associated WDs (i.e., within the respective femto-groups at the femto-tier), but also for transmissions at the NAN cluster level (i.e., within the pico-group at the pico-tier), as long as the radio technology and protocol used in a higher tier (i.e., a tier using a higher transmission power) can achieve self-organized time synchronization and scheduling of common time slots designated to communications within communication groups of respective lower tier(s) (i.e., tiers using lower transmission power) so that spatial reuse of the same frequency and time resources can be achieved among communication groups of the lower tier(s).

However, it may be advantageous (thus a preferred mode) that a lower power tier and its immediate higher power tier are based on a same radio technology and protocol, such as NAN. As described before, the higher power tier uses NAN or at least similar features as defined in NAN to achieve self-organized time synchronization, scheduling of common time slots that are designated to transmissions within communications groups of the lower power tier, and propagation of such scheduling information. If the lower power tier also uses NAN, for devices only capable of transmitting at a low transmission power, such as WDs, even though they are not capable of transmitting at a high transmission power, they are still capable of receiving and processing any signaling messages transmitted at a high transmission power within the NAN cluster or NDC, because these WDs, being usually a fraction of one meter away from their associated hub devices, are still within the coverage of the NAN Cluster or NDC. Therefore, they can synchronize, in time, with the other NAN devices in the NAN cluster and directly obtain the scheduling information of the designated low power time slots such as LPFA Intervals Bitmap by listening to signaling messages, such as NAN synchronization beacons, SDFs, NAFs, which are transmitted at a high transmission power during the DWs or designated high power time slots.

In addition, the WDs may also obtain information of the low transmission power range permissible in the NAN cluster or NDC in such a way by themselves. Because the existence of a WD may not be known to hub devices at the high power tier unless the WD device is associated with the hub device, the WD may receive and process signaling messages that are broadcasted to all devices or multicasted to all NAN devices in order to obtain the information mentioned above on its own. On the other hand, if at the lower power tier, a WD doesn't support NAN, for example, the WD only uses WLAN or Bluetooth to communicate with its associated hub device, then the hub device needs to obtain the scheduling information of the designated low power time slots such as LPFA Intervals Bitmap for the WD and provide the WD with such information via additional WLAN or Bluetooth signaling messages, before the WD forms or joins the femto-group with its associated hub device, or establishes a data link with its associated hub device. So, the hub device needs to provide a means, e.g., by transmitting a beacon or the alike at a high transmission power level during a high power time slot (such as 420 of FIG. 4) or at a low transmission power level during a low power time slot (such as 440 of FIG. 4) to allow the WD to discover the presence of the hub device, as well as the scheduling information of the designated low power time slots such as LPFA Intervals Bitmap. In this situation, any signaling messages that the WD transmits at the low transmission power outside the designated low power time slots may be completely overwhelmed by the high power transmissions from devices close by. Therefore, the WD should avoid performing active scanning (e.g., by sending a request blindly) to discover its hub device without knowing the LPFA Intervals Bitmap. But passive scanning (i.e., waiting for a beacon) may be time and power consuming. Therefore, the disadvantage of not using the same radio interface and protocol between the high power tier and the low power tier is quite obvious from the points of view of signaling overhead, latency, and power consumption incurred during the discovery of the associated hub device, joining or forming the femto-group, establishing the data link, not to mention that the hub device has to support both NAN, for the higher power tier, and WLAN or Bluetooth, for the lower power tier. In the situation where Bluetooth or another non-Wi-Fi radio interface is used at the lower power tier, additional complexity will be added to the hub device for supporting multiple radio interfaces.

According to an example embodiment, more than two transmission power ranges are supported. As an illustrative example, multiple pico-groups may be spatially separated and coordinated by a communications group (referred to as a micro-group) of another (higher) tier, which is made of devices with very high transmission power capability, wherein transmissions between devices of the micro-group are transmitted at a very high transmission power level within a very high transmission power range (such as from 200 to 500 mWatts), which is significantly higher than the high power levels used within individual pico-groups. The very high transmission power levels are used between devices that also operate as gateways, routers, or bridges, and may be used to coordinate the common schedules for spatial reuse among the pico-groups. If more than two transmission power ranges are supported, the LPFA Intervals Bitmap may need to be modified to properly indicate the time slots. As an example, instead of a single bit to indicate the transmission power level of a time slot, multiple bits are used to indicate the transmission power level of each time slot. However, the nature of the LPFA bitmap remains consistent. As another example, a very high power further available (VHPFA) Intervals Bitmap may be used to separately indicate the designated very high power time slots, while the LPFA Intervals Bitmap may be used to indicate the low power time slots.

Figure 8:
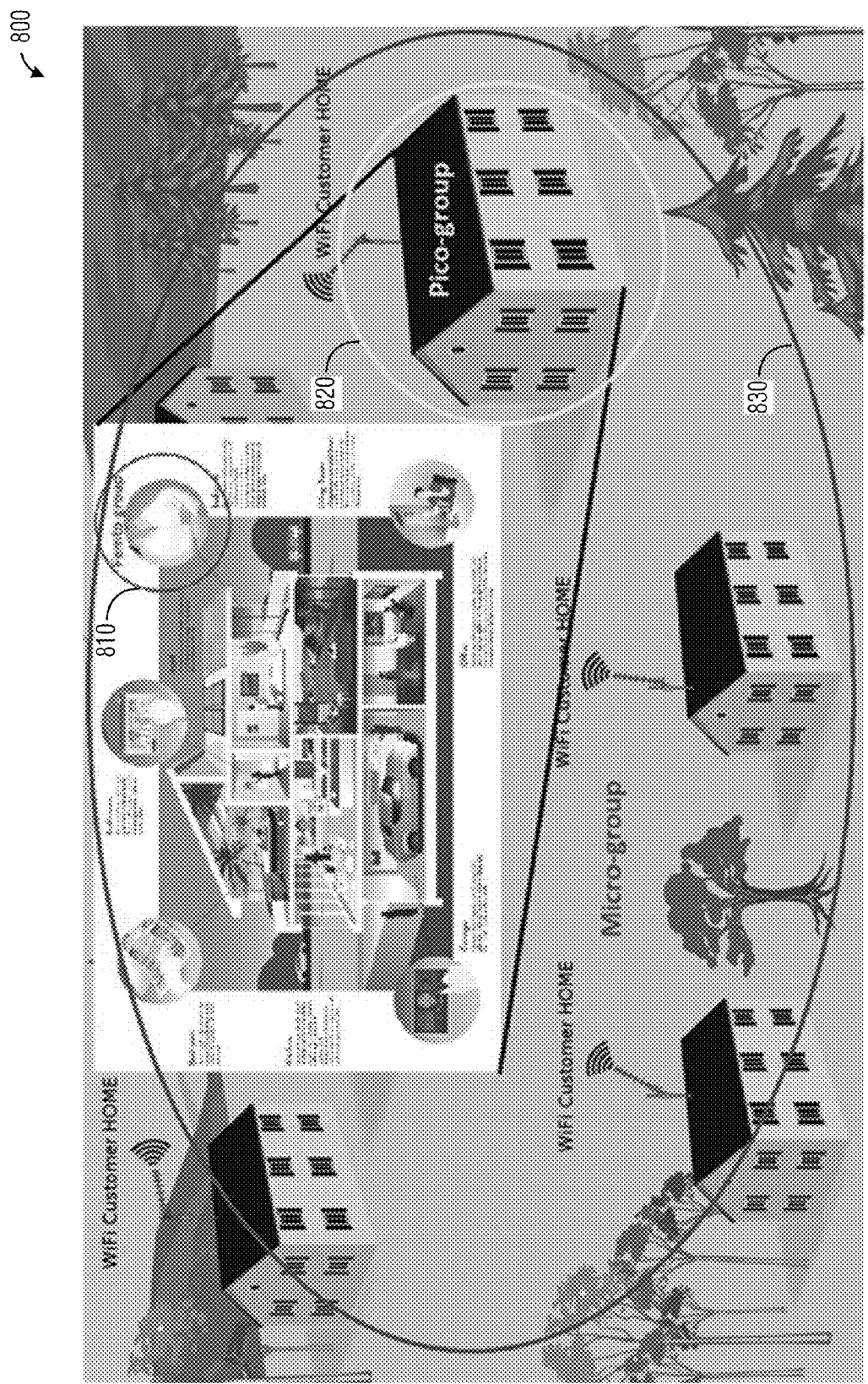
FIG. 8 illustrates an example communications system that utilizes three distinct transmission power ranges or levels according to embodiments presented herein.

FIG. 8 illustrates an example communications system 800 that utilizes three distinct transmission power ranges. Communications system 800 includes femto-groups (such as femto-group 810), each of which comprise a hub device (e.g., a smartphone or an access point) and associated WD(s). An example femto-group covers a person with a smartphone (operating as the hub device) wearing an activity monitor, and a health monitor. Within a femto-group, the hub device and associated WDs use designated low power time slots to communicate with one another. An example pico-group (such as pico-group 820) covers a single home and includes one or more femto-groups within in the same home. Within a pico-group, transmissions occurring at a high transmission power level are used among devices that are capable of transmitting at the high transmission power level, such as smartphones, home Wi-Fi routers, and so on, during designated high power time slots to achieve time synchronization among the femto-groups within the same home and to coordinate common schedules for spatial reuse among these femto-groups. An example micro-group (such as micro-group 830) covers a community and comprises one or more pico-groups within the same community. Within a micro-group, transmissions occurring at a very high transmission power level are used among devices capable of transmitting at the very high transmission power level, such as a home Wi-Fi router, a community gateway, and so on, during designated very high power time slots to achieve time synchronization among the pico-groups within the same community and coordinate common schedules for spatial reuse among these pico-groups.

Figure 9:
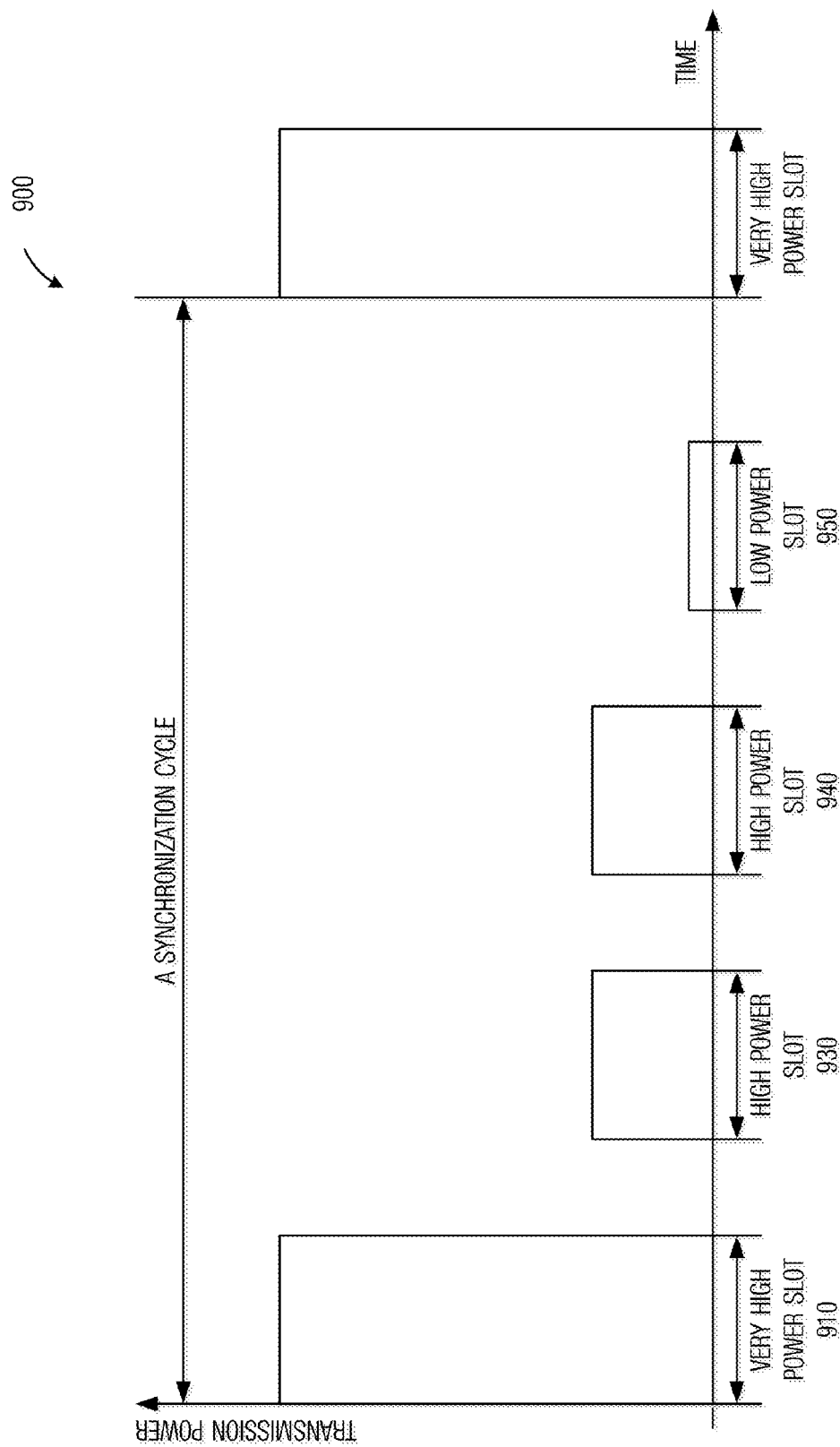
FIG. 9 illustrates a diagram illustrating transmission power level as a function of time slot in an example communications system supporting three different transmission power ranges or levels according to embodiments presented herein.

FIG. 9 illustrates a diagram 900 illustrating transmission power level as a function of time slot in an example communications system supporting three different transmission power ranges. As shown in FIG. 9, within a synchronization cycle (such as between DWs), there are time slots that support very high transmission power (e.g., very high power time slot 910), high transmission power (e.g., high power time slots 930 and 940), and low transmission power (e.g., low power time slot 950). Transmissions occurring during very high power time slot 910 may include signaling messages to propagate information about the NAN cluster, to facilitate time synchronization among devices within the NAN cluster, to schedule and maintain a common schedule of high power time slots (such as 930 and 940) or those of high power time slots and low power time slots (such as 950). The same frequency channel may be spatially reused among pico-groups, such as pico-group 820 of FIG. 8, during high power time slots 930 and 940. Such reusing in the space dimension is not shown in FIG. 9 to maintain simplicity. Transmissions occurring during high power time slots 930 and 940 may include signaling messages to schedule and maintain common schedule(s) of low power time slots (such as 950). The same frequency channel may be spatially reused among femto-groups, such as femto-group 810 of FIG. 8, during low power time slot 950. Such reusing in the space dimension is not shown in FIG. 9 to maintain simplicity. The configuration of the time slots may be the same for consecutive synchronization cycles. Alternatively, the configuration of the time slots may differ for consecutive synchronization cycles. Although shown in FIG. 9 as following a fixed sequence of very high power slots, followed by high power slots and low power slots, different synchronization cycles are possible. As an example, the sequence may be reversed. As another example, the different slots may be interspersed. Furthermore, the number of slots per power range may differ within a synchronization cycle and between different synchronization cycles.

Figure 10A:
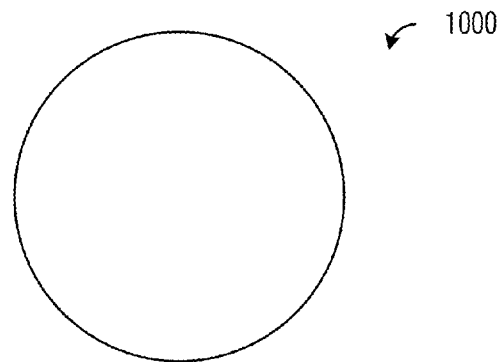
FIGS. 10A through 10C illustrate the spatial reuse of the shared spectrum of a communications system supporting three different transmission power ranges or levels according to embodiments presented herein.
Figure 10B:
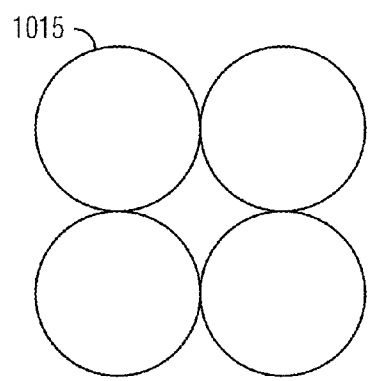
Figure 10C:
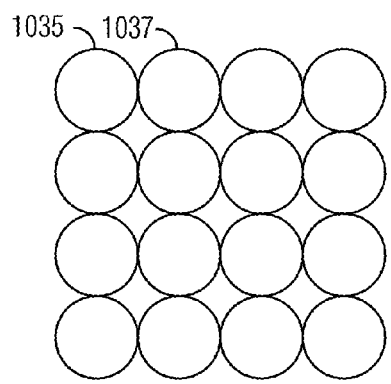

FIGS. 10A through 10C illustrate the spatial reuse of the shared spectrum of a communications system supporting three different tiers of communication groups and three different transmission power ranges or levels. In time slots where very high transmission power levels are used, coverage area 1000 (FIG. 10A) spans the entirety of the communications system at a first tier, e.g., a micro-group. In time slots where high transmission power levels are used, smaller coverage areas, such as coverage area 1015 (FIG. 10B), cover a portion of the communications system at a second tier thereby permitting devices of adjacent pico-groups at the second tier to reuse the shared spectrum. In time slots where low transmission power levels are used, small coverage areas, such as coverage areas 1035 and 1037 (FIG. 10C), cover a small portion of the communications system at a third tier thereby permitting a greater degree of spatial reuse of the shared spectrum among devices of adjacent femto-groups at the third tier.

Figures 11, 12:
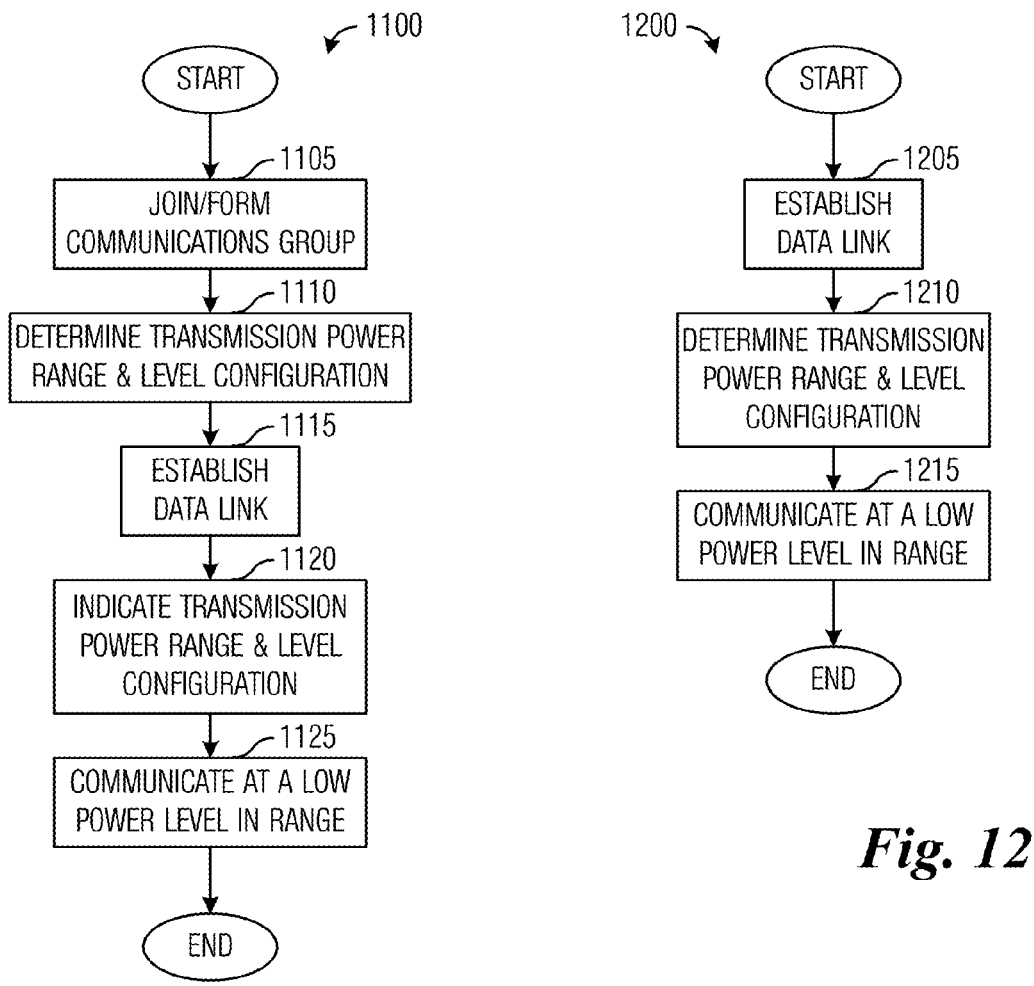
FIG. 11 illustrates a flow diagram of example operations occurring in a hub device according to embodiments presented herein.
FIG. 12 illustrates a flow diagram of example operations occurring in a WD according to embodiments presented herein.

FIG. 11 illustrates a flow diagram of example operations 1100 occurring in a hub device. Operations 1100 may be indicative of operations occurring in a hub device communicating with a WD at a low transmission power level during a low power time slot.

Operations 1100 begin with the hub device joining a communications group or forming a communications group with another hub device (block 1105). The hub device joins a communications group, such as a NAN cluster, or forms a communications group, such as a NAN cluster, with the other hub device, to achieve time synchronization with other hub devices within the communications group. The hub device determines a transmission power range and level configuration (block 1110). The hub device may coordinate with other hub devices to determine a transmission power range and level configuration, which specifies transmission power ranges and levels for different time slots, as well as the occurrence of each time slot. In other words, the coordination between the hub devices specifies the scheduling of the times slots. The scheduling of the time slots may be used to generate one or more LPFA Intervals Bitmaps. Alternatively, the hub device receives the transmission power range and level configuration, e.g., one or more LPFA Intervals Bitmaps, from another hub device.

The hub device establishes a data link with at least one WD (block 1115). The hub device establishes a data link, such as a NAN data link, with the at least one WD. The hub device indicates the transmission power range and level configuration (block 1120). Such an indicating may occur during the establishment of the data link in block 1115. For example, the indicated transmission power range and level configuration may be part of the messages that are used to establish the data link, such as an NDL setup request message and an NDL setup response message. Therefore, such configuration may be negotiable during the establishment of the data link. The hub device may indicate whether a transmission power level within a specific transmission power range is to be used on the data link. The hub device may indicate the transmission power range and level configuration by signaling the LPFA bitmap to the at least one WD in a LPFA field. The hub device and the at least one WD communicate at a low power level within a low power range in accordance with the transmission power level configuration (block 1125). The hub device and the at least one WD communicate at the low power level within the low power range in one or more low power time slots, which is indicated in the transmission power level configuration (e.g., LPFA bitmap).

FIG. 12 illustrates a flow diagram of example operations 1200 occurring in a WD. Operations 1200 may be indicative of operations occurring in a WD communicating with a hub device at a low power level during a low power time slot.

Operations 1200 begin with the WD forming a data link with an associated hub device (block 1205). The WD forms a data link, such as a NAN data link, a WLAN data link, a Bluetooth data link, etc., with the associated hub device. The WD determines a transmission power range and level configuration (block 1210). The WD receives a message with a schedule of low power time slots in one or more LPFA Intervals Bitmap fields, for example. The WD may receive such a message from its associated hub device, or from a device within a NAN cluster, which is not the associated hub device of the WD. In the later situation, such a message may be a broadcast message, such as a beacon. The WD and the associated hub device communicate at a low transmission power level within a low transmission power range in accordance with the transmission power level configuration (block 1215). The WD and the associated hub device communicate at the low transmission power level within the low transmission power range in one or more low power time slots, which is indicated in the transmission power level configuration (e.g., LPFA Interval Bitmap).

Figure 13:
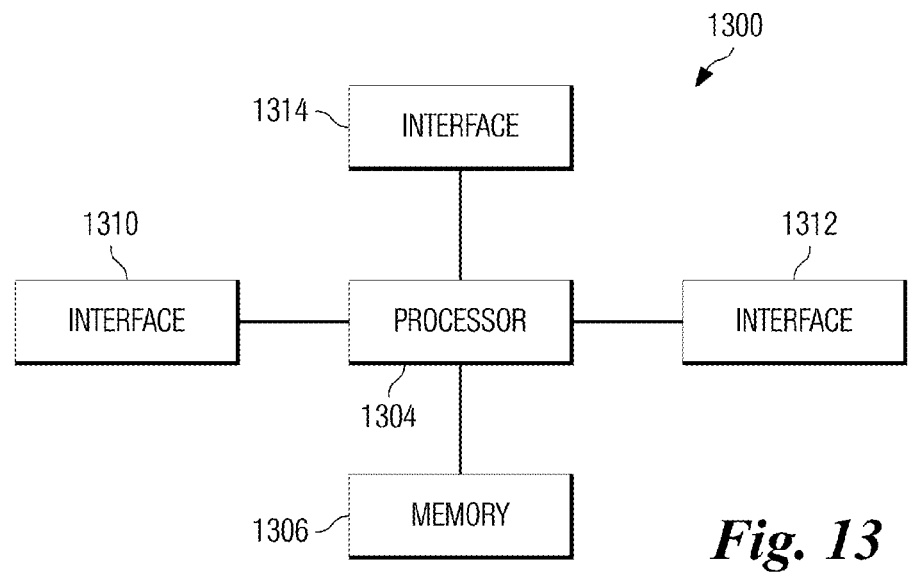
FIG. 13 illustrates a block diagram of an embodiment processing system for performing methods described herein.

FIG. 13 illustrates a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a public access point, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a home access point, a smartphone functioning as an access point, a relay device plugged in a power line at a home, a user equipment (UE), a personal computer (PC), a tablet, a wearable communications device (e.g., a smartwatch, etc.), a sensor, an actuator, a motor, a pump, or any other device adapted to access a telecommunications network.

Figure 14:
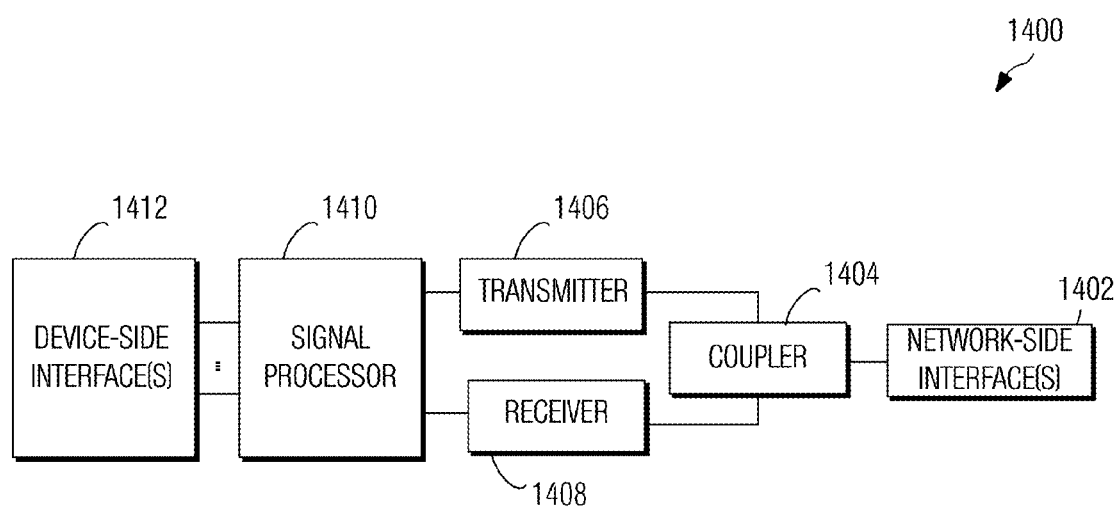
FIG. 14 illustrates a block diagram of a transceiver adapted to transmit and receive signaling over a wireless telecommunications network according to embodiments presented herein.

In some embodiments, one or more of the interfaces 1310, 1312, 1314 connects the processing system 1300 to a transceiver adapted to transmit and receive signaling over a wireless telecommunications network. FIG. 14 illustrates a block diagram of a transceiver 1400 adapted to transmit and receive signaling over a wireless telecommunications network, such as a NAN. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. Specific processing systems and/or transceivers may utilize all of the components shown, or only a subset of the components, and levels of integration may vary from device to device.

It is envisioned that the inventive techniques described in this disclosure can also be used in many other applications in addition to wearable devices. For an example, in livestock industry, in a similar role as a WD, a bio-sensor may be ingested in a cow's stomach in order to monitor the health status of the cow. Communications between the bio-sensor in the cow and a computer with a display unit are carried out by a short range radio link between the bio-sensor in the cow and a radio hub device installed on a collar worn by the cow and a long range radio link between the radio hub device on the cow and an access point, which is installed near a farmer's or veterinarian's office and connected to the computer. In this situation, a femto-group may be made of a bio-sensor and a radio hub device on the same cow. A pico-group may be made of the access point and radio hub devices worn by cows of a same herd. For another example, robots may be used at a factory floor for manufacturing products or at a warehouse for moving inventory. There may be many moving parts in a robot. These moving parts are driven by various servo motors that receive commands from a processor in the robot. If the commands are carried over wires between the processor and servo motors, it will increase the robot's weight, a risk that wires may be broken after a while due to the constant movement, and the maintenance costs for repairing the broken wires. So, instead of using wires, a miniature and low power Wi-Fi transceiver (a Category 2 device), in a similar role as a WD, may be installed on each servo motor in order to communicate with a dual-power-capable Wi-Fi transceiver (a Category 1 device) connecting to the processor in the robot. The dual-power-capable Wi-Fi transceiver connecting to the processor in the robot may play a role as the hub device for the low power Wi-Fi transceivers by further relaying, through an access point, the commands to or from a central control unit, which controls all the robots. In this situation, a femto-group may be made of the low power Wi-Fi transceivers and the dual-power-capable Wi-Fi transceiver on the same robot. A pico-group may be made of the access point and the dual-power-capable Wi-Fi transceivers connecting to the processors in the respective robots on the factory floor or in the warehouse.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a communicating access unit/module, an indicating unit/module, a measuring unit/module, and an estimating unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for inter-device communications, the method comprising:
   obtaining, by a first device, a transmission power level configuration of time slots of a shared channel using communications occurring within a first communications group and at a first transmission power level;
   transmitting, by the first device, a message indicating the transmission power level configuration to a second device, the message indicating a time slot designated for communications occurring at a second transmission power level, and the message comprising a low power further availability (LPFA) bitmap indicating that the time slot is designated for the communications occurring at the second transmission power level; and
communicating, by the first device, with the second device in the time slot in accordance with the transmission power level configuration, the communications occurring during the time slot at the second transmission power level, the second transmission power level being lower than the first transmission power level.

2. The method of claim 1, further comprising establishing, by the first device, a second communications group with the second device in accordance with one of Neighbor Awareness Networking (NAN), wireless local area network (WLAN), Wi-Fi Direct, Bluetooth, Bluetooth Low Energy (BLE), ZigBee, Long Term Evolution (LTE) Direct, LTE Unlicensed (LTE-U), or License Assisted Access (LAA) standard, the first communications group being a NAN cluster.

3. The method of claim 1, the obtaining the transmission power level configuration comprising receiving the bitmap from a third device of the first communications group at the first transmission power level.

4. The method of claim 1, the transmitting further comprising transmitting the message at the first transmission power level.

5. The method of claim 1, the communicating with the second device comprising at least one of transmitting a first frame to the second device or receiving a second frame from the second device, the first and second frames being used to perform at least one of discovering a service, managing a data link, or carrying data.

6. The method of claim 1, further comprising:
determining, by the first device, the second transmission power level so that the communications with the second device do not interfere with communications occurring between third and fourth devices during the time slot; and
indicating, by the first device, the second transmission power level to the second device.

7. The method of claim 6, further comprises:
obtaining, by the first device, an interference tolerance threshold of the third device;
receiving, by the first device, a signal transmitted by the third device;
measuring, by the first device, a signal strength of the received signal; and
estimating, by the first device, a path loss between the first and third devices based on a transmission power used by the third device to transmit the received signal and the signal strength of the received signal,
the determining the second transmission power level being in accordance with the estimated path loss and the interference tolerance threshold.

8. A method for inter-device communications, the method comprising:
receiving, by a first device, a message including a first indication of a transmission power level configuration of time slots of a shared channel, and indicating a time slot designated for communications occurring at a first transmission power level, from a third device of a first communications group not associated with the first device, the first indication comprising a low power further availability (LPFA) bitmap indicating that the time slot is designated for the communications occurring at the first transmission power level; and
communicating, by the first device, with a second device associated with the first device in the time slot in accordance with the first indication indicating the transmission power level configuration, the communications occurring during the time slot being at the first transmission power level, the first transmission power level being lower than a second transmission power level at which communications within the first communications group occur.

9. The method of claim 8, further comprising establishing, by the first device, a second communications group with the second device in accordance with one of Neighbor Awareness Networking (NAN), wireless local area network (WLAN), Wi-Fi Direct, Bluetooth, Bluetooth Low Energy (BLE), ZigBee, Long Term Evolution (LTE) Direct, LTE Unlicensed (LTE-U), or License Assisted Access (LAA) standard, the first communications group being a NAN cluster.

10. The method of claim 8, the communicating with the second device comprising at least one of transmitting a first frame to the second device or receiving a second frame from the second device, the first and second frames being used to perform at least one of discovering a service, managing a data link, or carrying data.

11. The method of claim 8, further comprising receiving, by the first device, information conveying the first transmission power level.

12. A first device adapted to perform inter-device communications, the first device comprising:
a non-transitory memory storage comprising instructions; and
a processor in communication with the memory storage, wherein the processor executes the instructions to:
obtain a transmission power level configuration of time slots of a shared channel using communications occurring within a first communications group and at a first transmission power level,
transmit a message indicating the transmission power level configuration to a second device, the message indicating a time slot designated for communications occurring at a second transmission power level, and the message comprising a low power further availability (LPFA) bitmap indicating that the time slot is designated for the communications occurring at the second transmission power level, and
communicate with the second device in the time slot in accordance with the transmission power level configuration, wherein the communications occurring during the time slot are at the second transmission power level, and wherein the second transmission power level is lower than the first transmission power level.

13. The first device of claim 12, wherein the processor executing the instructions to obtain the transmission power level configuration comprises the processor executing the instructions to receive the bitmap from a third device of the first communications group at the first transmission power level.

14. The first device of claim 12, wherein the processor executes the instructions to determine the second transmission power level so that the communications with the second device do not interfere with the communications occurring between third and fourth devices during the time slot, and indicate the second transmission power level to the second device.

15. The first device of claim 14, wherein the processor executes the instructions to:
obtain an interference tolerance threshold of the third device;

receive a signal transmitted by the third device;
measure a signal strength of the received signal; and
estimate a path loss between the first and third devices based on a transmission power used by the third device to transmit the received signal and the signal strength of the received signal,
wherein the processor executing the instructions to determine the second transmission power level comprise the processor executing the instructions to determine the second transmission power level in accordance with the estimated path loss and the interference tolerance threshold.

16. The first device of claim 12, wherein the processor executing the instructions to transmit further comprises the processor executing the instructions to transmit the message at the first transmission power level.

17. The first device of claim 12, wherein the processor executing the instructions to communicate with the second device comprises the processor executing the instructions to at least one of transmit a first frame to the second device or receive a second frame from the second device, wherein the first and second frames are used to perform at least one of discovering a service, managing a data link, or carrying data.

18. A first device adapted to perform inter-device communications, the first device comprising:
a non-transitory memory storage comprising instructions; and
a processor in communication with the memory storage, wherein the processor executes the instructions to:
receive a message including a first indication of a transmission power level configuration of time slots of a shared channel, and indicating a time slot designated for communications occurring at a first transmission power level, from a third device of a first communications group not associated with the first device, the first indication comprising a low power further availability (LPFA) bitmap indicating that the time slot is designated for the communications occurring at the first transmission power level, and
communicate with a second device associated with the first device in time slot in accordance with the first indication indicating the transmission power level configuration, wherein the communications occurring during the time slot are at the first transmission power level, and wherein the first transmission power level is lower than a second transmission power level at which communications within the first communications group occur.

19. The first device of claim 18, wherein the processor executes the instructions to at least one of transmit a first frame to the second device or receive a second frame from the second device, wherein the first and second frames are used to perform at least one of discovering a service, managing a data link, or carrying data.

20. The first device of claim 18, wherein the processor executes the instructions to receive information conveying the first transmission power level.

* * * * *